United States Patent
Munsell et al.

(10) Patent No.: US 11,374,915 B1
(45) Date of Patent: Jun. 28, 2022

(54) SECURITY CHALLENGE BYPASS

(71) Applicant: Amazon Technologies, Inc., Seattle, WA (US)

(72) Inventors: Andrew Munsell, Bellevue, WA (US); Chris Heelan, Seattle, WA (US); Harnil C. Rafalia, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 329 days.

(21) Appl. No.: 16/446,494

(22) Filed: Jun. 19, 2019

(51) Int. Cl.
*H04L 29/06* (2006.01)
*H04L 9/40* (2022.01)
*H04L 9/32* (2006.01)

(52) U.S. Cl.
CPC ........ *H04L 63/0807* (2013.01); *H04L 9/3213* (2013.01); *H04L 9/3271* (2013.01); *H04L 63/10* (2013.01)

(58) Field of Classification Search
None
See application file for complete search history.

(56) References Cited

U.S. PATENT DOCUMENTS

| | | | | |
|---|---|---|---|---|
| 8,370,952 B1 * | 2/2013 | Wieder | .................. | H04L 67/306 726/26 |
| 2010/0223471 A1 * | 9/2010 | Fresko | .................. | H04L 63/168 713/176 |
| 2013/0097427 A1 * | 4/2013 | Billings | ................ | H04L 9/3273 713/182 |

OTHER PUBLICATIONS

Author: Rene Ritchie; "Touch ID in iOS: Explained"; https://www.imore.com/touch-id-ios-explained; Date: Aug. 27, 2014; pp. 1-9 (Year: 2014).*
Author: Chris Davies; "Chrome is adding Touch ID and fingerprint sensor support for web apps"; https://www.slashgear.com/chrome-is-adding-touch-id-and-fingerprint-sensor-support-for-web-apps-14545704/; Date: Sep. 14, 2018; pp. 1-4 (Year: 2018).*

* cited by examiner

*Primary Examiner* — Andrew J Steinle
(74) *Attorney, Agent, or Firm* — Davis Wright Tremaine LLP

(57) ABSTRACT

An authentication system of a service generates a session corresponding to a browser of a client device in response to the browser accessing a webpage of the service. Through the webpage, the authentication system presents a security challenge and an option for requesting a bypass to the security challenge. In response to selection of the option, the authentication system establishes a communications session between the client device and a service agent that can verify the identity of a user of the client device. If the identity of the user is verified, the service agent can request issuance of a bypass token usable to bypass the security challenge. If a request is received from the service agent, the bypass token is generated and issued to the client device. The client device uses the bypass token to remove the security challenge from the webpage without the user providing the correct response.

19 Claims, 9 Drawing Sheets

SECURITY CHALLENGE BYPASS

BACKGROUND

Secure network communications are an important feature of modern computing environments. To provide secure network communications, a variety of secure network protocols have been developed that attempt to validate the identities of the parties to a communication, and then attempt to secure the content of the network communications through encryption. Some attackers deploy automated systems that attempt to intercept secure network connections. Limiting the impact of automated attacks on secure network communications is a challenging problem.

To prevent the attackers from deploying these automated systems, various technical measures and practices exist for excluding or hindering automated-agents from accessing website content by implementing security challenge techniques such as blocking an Internet protocol (IP) addresses, disabling web services, blocking automated-agents based on excessive traffic monitoring, attempting to learn automated-agent behavior, implementing reverse Turing test, using Completely Automated Public Turing test to tell Computers and Humans Apart (CAPTCHA) or other human interaction proofs. Conventional techniques, however, are often prone to misapplication, such as by inhibiting legitimate access, thereby causing a poor user experience. For example, content appearing in security challenges may be undiscernible to human users, and certain security challenges may be difficult to understand for some users. These issues may lead to systems unintentionally prohibiting legitimate access from users.

An approach to improve user experience includes whitelisting a group of users from security challenges, in which the group have been previously verified by the computer resource service provider. Although this approach may be the most convenient, such approach is problematic in that it may expose security vulnerability in situations in which the whitelisted customer's credentials are inappropriately used. Accordingly, there is a challenge in current authentication systems to provide mechanisms to bypass security challenges for legitimate users while preventing attackers at the same time.

BRIEF DESCRIPTION OF THE DRAWINGS

Various techniques will be described with reference to the drawings, in which.

DETAILED DESCRIPTION

Figure 1:
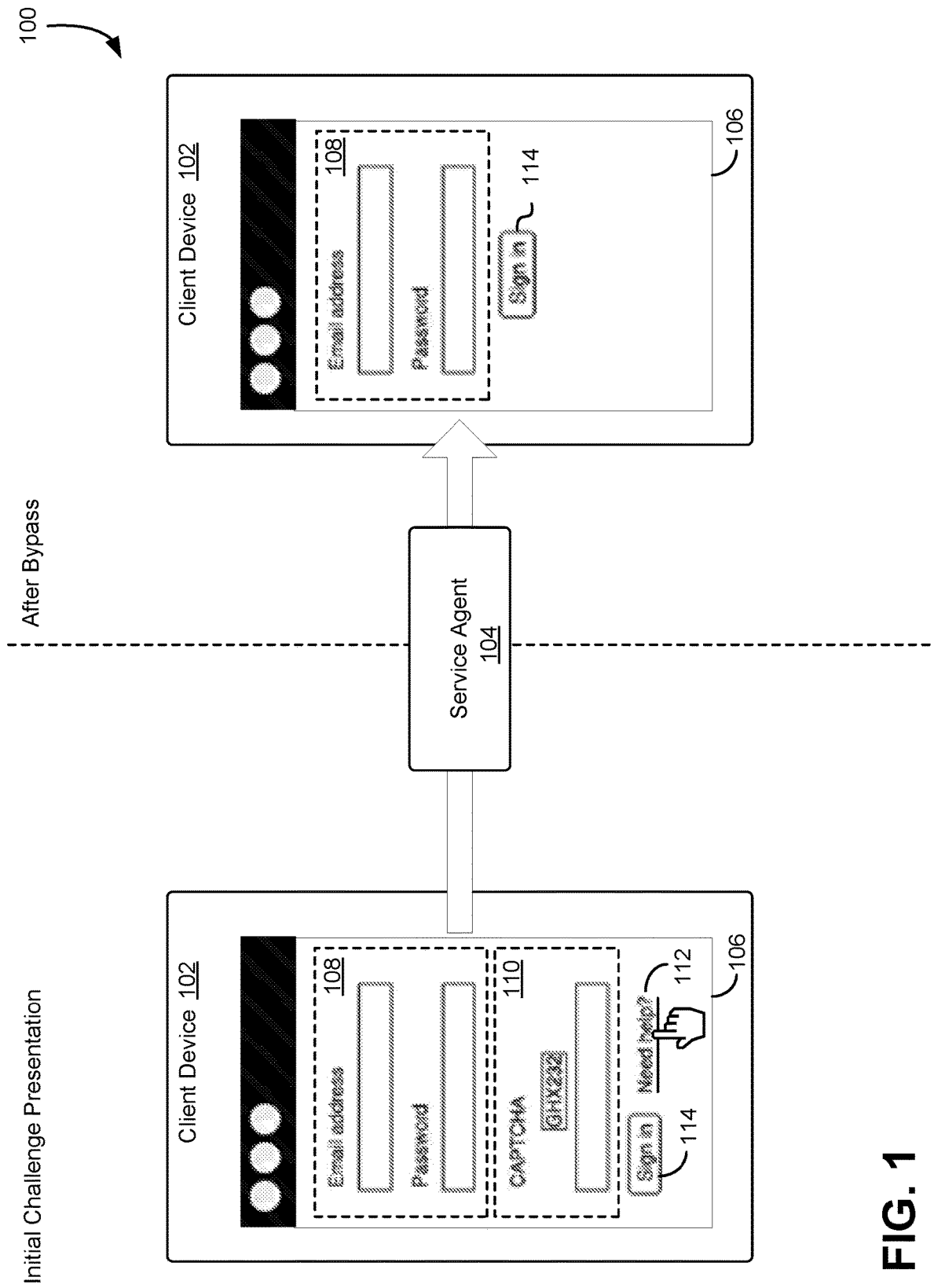
FIG. 1 shows an illustrative example of a system in which various embodiments can be implemented.

Techniques described and suggested herein relate to enhancements for reducing the number of security challenges shown to customers, while allowing bypass of security challenges in the absence of whitelisting. In an example, a customer of a computing resource service provider submits, via a browser application or other graphical user interface (GUI) of a client device, a request to access resources provided by the computing resource service provider. In response to the request, the client device may obtain, from an authentication system of the computing resource service provider, a request for user information (e.g., username, password, cryptographic keys, etc.), as well as a security challenge that is to be completed by the user in order to access the resources provided by computing resource service provider. The security challenge may include a challenge-response test, a CAPTCHA challenge, and the like. In addition to the request for user information and the security challenge, the authentication system may provide an option to enable the user to communicate with a service provider agent to request bypassing of the security challenge for accessing the resources provided by the computing resource service provider.

In one example, if the user, via the browser application or other GUI of the client device, selects the option to communicate with a service provider agent to request bypassing of the security challenge, the client device transmits a request to the authentication system to establish a communications session between the client device and a computing device of a service provider agent. Through this communications session, the user may provide the service agent with credential information that may be used by the service agent to authenticate the user. The service agent may evaluate the provided credential information to determine whether authentication of the user is possible. If so, the service agent, through its computing device, may submit a request to a service agent backend system for issuance of a bypass token to the user that may be used to bypass the security challenge presented via the browser application or other GUI of the client device.

In an example, the service agent backend system generates, in response to the request from the service agent, the bypass token for use by the user, via the browser application or other GUI of the client device, to bypass the security challenge. The service agent backend system may transmit the bypass token to the client device, which may implement the bypass token through the browser application or other GUI of the client device being used by the user to access the resources of the computing resource service provider. The bypass token may be a CAPTCHA skeleton key that may be used to generate a correct response to a presented CAPTCHA challenge. Alternatively, the bypass token may include a digital signature or other cryptographic assertion of the service agent backend system that serves as an indication that the security challenge may be bypassed while the bypass token is active (e.g., has not expired). The browser application or other GUI of the client device may transmit, through the client device, the bypass token to the authentication system of the computing resource service provider.

In an example, the authentication system evaluates the bypass token to determine whether it is valid. For instance, the authentication system may determine whether the bypass token has expired, whether the bypass token was issued by the service agent backend system, whether the bypass token was provided by an authorized entity (e.g., the bypass token was issued to the user), and the like. If the bypass token is valid, the authentication system may remove, from the browser application or other GUI of the client device, the security challenge and allow the user to access the resources of the computing resource service provider via use of its credential information.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. For instance, because a user may be provided with an option, through a browser application or other GUI, to communicate with a service agent to request bypassing of a security challenge, users having difficulty in reading CAPTCHA challenges or answering security challenges may have a remedy to overcome these difficulties while still being able to access resources provided by a computing resource service provider. Additionally, because the user is required to provide credential information or other authentication information to a service agent in order to obtain a bypass token for bypassing these security challenges, authentication of the user is still performed by the computing resource service provider. Thus, in the absence of whitelisting, the user may be considered to be authenticated when the bypass token, along with valid credential information, are provided to the computing resource service provider.

FIG. 1 shows an illustrative example of a system 100 in which various embodiments can be implemented. In the system 100, a user of a client device 102 may access, via the client device 102, a webpage or other information presentable through a display element of the client device 102. The client device 102 may be an electronic device that includes a mechanism for communication (e.g. WiFi, Bluetooth®, Near Field Communication (NFC), etc.), a mechanism for determining its physical location, and a mechanism for processing and executing commands received from a user. In an embodiment, the user utilizes a browser application 106, via the client device 102, to navigate to a webpage or other information presentable via the display element of the client device 102. For instance, the user may provide, via the browser application 106, a Uniform Resource Identifier (URI) corresponding to the requested webpage. The client device 102 may utilize this URI, in conjunction with a Domain Name System (DNS) server, to identify a server that maintains the webpages associated with the URI. This server may transmit the data associated with the webpages to the client device 102, which may present the webpages to the user via a display element of the client device 102 through the browser application 106, fulfilling the user's request. While webpages are used extensively throughout the present disclosure for the purpose of illustration, other content may be utilized with the techniques described herein. For instance, other content may include digital text documents, applications, video games, electronic mail messages, text messages, and the like.

The webpage presented via the browser application 106 may include HyperText Markup Language (HTML) code, Cascading Style Sheets (CSS), JavaScript, and/or other technologies usable to present, via a display element, various elements of the webpage in a manner that may be understandable to a user. For instance, a webpage may include a variety of text and images that may be readable by a human. A webpage may be divided into various headings that may enable users to skim and find what is interesting on the webpage. Under each heading, the webpage may include text and images related to the heading. In an embodiment, the webpage includes one or more navigation links usable to access other webpages associated with the webpage or to cause additional information and content to be presented via the webpage. For instance, a navigation link, if selected, may cause the webpage to be updated to present additional information. Alternatively, a navigation link, if selected, may cause the client device 102 to transmit a request to a DNS server to identify a server that maintains the webpages associated with a URI encoded into the navigation link. This may cause the client device to redirect the user to another webpage, which may include new information presentable via the display element of the client device 102.

In an embodiment, the webpage includes a user identity information field 108 and a security challenge field 110, which the user of the client device 102 may be required to complete in order to access other webpages provided by a computing resource service provider or other entity that maintains the webpage and other resources associated with the webpage. For instance, through the user identity information field 108, a user may be required to provide its electronic mail address and a corresponding password, as illustrated in FIG. 1, which may be verified by the computing resource service provider or other entity responsible for authenticating users requesting access to webpages and other resources provided by the computing resource service provider. Through the user identity information field 108, a user may provide its credential information, which may include, among other things, a username, a corresponding password, biometric information, a cryptographic key, a unique identifier, a set of credentials, a hash of the set of credentials, a digital signature generated using a credential, a message authentication code generated based at least in part on a credential, and the like.

It should be noted that while the user identity information field 108 and the security challenge field 110 are presented and described extensively throughout the present disclosure as being displayed on a single webpage via the browser application 106, the security challenge field 110 and the security challenge can be presented in alternative ways. For instance, in an embodiment, the security challenge field 110 can be presented on a standalone authentication webpage presented via the browser application 106. Alternatively, the security challenge field 110 can be presented on a separate application on the client device 102. For example, if the user provides, through the user identity information field 108, its credential information and selects the sign in button 114, the authentication system may cause the client device 102 to be redirected to another webpage that includes the security challenge field 110 and the security challenge that is to be completed by the user. In another embodiment, the security challenge field 110 and the security challenge can be presented to the user in response to user interaction on a webpage presented via the browser application 106. As an illustrative example, if a user interacts with one or more fields on a webpage provided by the computing resource service provider (e.g., selects an option to generate a review, interacts with a drop-down menu presented on the webpage, etc.), the authentication system may generate and present, via the webpage, the security challenge field 110 and the security challenge that the user is to complete in order to permit continued interaction with the one or more fields on the webpage.

In an embodiment, an authentication system of the computing resource service provider obtains, from the client device 102, identifying information (e.g., an Internet Protocol (IP) address of the client device 102, cookies, etc.) that may be useful in determining a set of characteristics of the particular client device 102. For instance, the authentication system may utilize this received identifying information to identify any past activity performed by the client device 102 and, based on this past activity, determine a level of suspicion that the client device 102 is actually a bot or other automated process. Additionally, the information provided by the client device 102 may be utilized to determine whether the client device 102 is part of a botnet. For instance, if the authentication system determines that a significant number of requests emanate from a particular IP address and these requests occur with great frequency, the authentication system may suspect that this particular client device 102 may be part of a botnet. It should be noted that automated agents may be colloquially called "bots" or "robots" and are distinguishable from client applications configured to auto-fill entry fields with customer information by way of being able to navigate through a site or other collection of user interface pages in an automated fashion.

To combat this, the authentication system may implement a variety of CAPTCHA challenges or other security challenges to distinguish a legitimate user from an automated agent or automated process. For example, as illustrated in FIG. 1, an authentication system may transmit data associated with a CAPTCHA challenge or other security challenges to the client device 102, which may present the CAPTCHA challenge or other security challenges to the user via a display element of the client device 102 through the browser application 106. The CAPTCHA challenge or other security challenges may be presented on the webpage, for instance, through a security challenge field 110. The user of the client device 102 may be required to complete the security challenge presented via the security challenge field 110 in order to access other webpages provided by a computing resource service provider or other entity that maintains the webpage and other resources associated with the webpage. For instance, through the security challenge field 110, a user may be required to provide a response to the presented security challenge (e.g., characters presented in a CAPTCHA challenge, an answer to a security question, etc.), as illustrated in FIG. 1, which may be verified by the computing resource service provider or other entity responsible for authenticating users requesting access to webpages and other resources provided by the computing resource service provider. It should be noted that while CAPTCHA challenges are used extensively throughout the present disclosure, other security challenges may be presented via the security challenge field 110 as an alternative to CAPTCHA challenges or in addition to CAPTCHA challenges. For instance, as an alternative to a CAPTCHA challenge, the user may be presented with a security question, a request for a one-time password, a request for a proof of work, a response to a Domain Controller Query (DCQ), an indication that the user is to contact a service agent in order to proceed, and the like.

In an embodiment, the authentication system provides, to the client device 102, a URI corresponding to a computing device of a service agent that can be used to request a bypass to the security challenge presented via the security challenge field 110. The client device 102 may generate, in response to obtaining the URI, a link 112 that may be presented to the user via the browser application 106. For example, in some scenarios, CAPTCHA challenges may prevent legitimate users from accessing resources provided by the computing resource service provider, as these challenges may be difficult for some users to complete. Thus, if the user of the client device 102 is unable to complete the security challenge presented in the security challenge field 110, the user may select the link 112 presented via the browser application 106 to submit a request to bypass the security challenge.

If the user selects the link 112, the client device 102 may transmit a request to the authentication system to initiate a communications session between the client device 102 and a computing device of a service agent 104 that may authenticate the user. In an embodiment, if the user selects the link 112, the client device 102 executes programmatic code, provided by the authentication system, to display a web widget that the user may utilize to interact with the service agent 104 once the communications session has been established between the client device 102 and the computing device of the service agent. Through the web widget, the user may submit its credential information and/or other information that may be used by the service agent 104 to authenticate the user. Additionally, through the web widget, the service agent 104 may prompt the user to provide other information that may be used to authenticate the user and determine that the user is not a bot. For instance, the service agent 104 may ask the user to provide its birthdate or any other personally identifiable information (PII) that the service agent 104 may use to authenticate the user and determine that the user is not a bot. Similarly, the service agent 104 may ask the user about information that may be stored within the user's account maintained by the computing resource service provider. Through the web widget, the service agent 104 may directly speak with the user and ascertain, based on a conversation with the user, that the user can be authenticated and is not a bot.

In an embodiment, if the service agent 104 determines that the user can bypass the security challenge presented via the security challenge field 110, the service agent 104, via its computing device identifies the session associated with the client device 102 and the elements of the security challenge presented to the user via the browser application 106. For example, the service agent 104 may query the authentication system to identify the GUI components, such as the elements presented within the security challenge field 110, that are to be removed or hidden from the webpage. Further, the service agent 104 may determine, based on the security challenge presented, whether a bypass application programming interface (API) command is available for requesting removal of the security challenge or whether a request is to be made to obtain a skeleton key or other algorithm that may be used for automatically completing the security challenge on the user's behalf. The service agent 104 may transmit a request to a security challenge system of the computing resource service provider to request creation of a bypass token usable to bypass the security challenge presented via the security challenge field 110.

In response to obtaining the request from the service agent 104, the security challenge system may evaluate the session associated with the client device 102 and the elements of the security challenge presented to the user via the browser application 106 to determine the parameters of the bypass token to be issued to the client device 102. For instance, if the security challenge system determines that the browser application 106 does not support JavaScript, the security challenge system may determine that the bypass token is to include a skeleton key or other cryptographic information that may be used to resolve the security challenge presented to the user. Alternatively, if the security challenge system determines that the browser application 106 supports JavaScript, the security challenge system may generate a bypass token that may be used by the browser application 106 to remove the security challenge field 110 and, hence, the security challenge from the webpage. Thus, if the service agent 104 has approved the bypass of the security challenge presented to the user on the webpage presented via the browser application 106, the security challenge system may transmit the bypass token, skeleton key, or other cryptographic information to allow the browser application 106 to remove or otherwise bypass the security challenge presented via the security challenge field 110.

As noted above, the webpage presented via the browser application 106 may include HTML code, CSS, JavaScript, and/or other technologies usable to present, via a display element, various elements of the webpage in a manner that may be understandable to a user. In an embodiment, the webpage includes a programmatic script that is executed by the browser application 106 and causes the browser application 106 to query the security challenge system to determine whether a bypass token is available for removal or bypass of the security challenge presented via the security challenge field 110. If a bypass token is available, the browser application 106 may obtain the bypass token from the security challenge system. Further, in response to obtaining the bypass token from the security challenge system, the browser application 106 may identify the UI elements of the security challenge presented within the security challenge field 110 and remove these from the webpage. Thus, from the user perspective, the security challenge field may disappear from the webpage viewable through the display element of the client device 102. It should be noted that while the use of a script is described extensively throughout the present disclosure for obtaining the bypass token, the bypass token may be pushed to the browser application 106 by the security challenge system upon creation. In an alternative embodiment, in response to obtaining the bypass token, the browser application 106 can provide the bypass token to the authentication system, which redirects the client device 102 to another webpage through which the user can access the requested resources. Thus, rather than having the UI elements be removed from the webpage, the user may be redirected to another webpage through which it can access the resources provided by the computing resource service provider.

In an embodiment, if the browser application 106 does not support the use of programmatic scripts (e.g., JavaScript, etc.), the security challenge system transmits a skeleton key or other information that may be used to automatically complete the security challenge presented in the security challenge field 110. For instance, in response to obtaining a skeleton key, the browser application 106 may use the skeleton key to generate the response to the security challenge and input the response into the corresponding input field presented within the security challenge field 110. Similarly, if the browser application 106 receives, from the security challenge system, a response to the security challenge presented on the webpage through the security challenge field 110, the browser application may input this response into the corresponding input field presented within the security challenge field 110.

If the bypass token is obtained by the browser application 106 and the security challenge field 110 has been removed from the webpage, the user of the client device 102 may input its credential information into the appropriate fields within the user identity information field 108 of the webpage. Further, the user of the client device 102 may select the sign in button 114 to submit its credential information to the authentication system, which may evaluate the credential information. In an embodiment, if the user selects the sign in button 114, the browser application 106 may transmit, via the client device 102, the credential information provided by the user and the bypass token previously provided by the security challenge system. In response to obtaining the credential information and the bypass token, the authentication system may determine whether the user can be authenticated. For instance, the authentication system may evaluate the provided credential information to determine whether the credential information is valid for the user. Additionally, the authentication system may evaluate the bypass token to determine whether it is valid and that it can be used to bypass the security challenge previously presented to the user. For instance, the authentication system may provide the bypass token to the security challenge system for validation. Alternatively, the authentication system may identify, from the bypass token, the session identifier for the webpage session of the user and the parameters of the security challenge that is being bypassed. These parameters may include an identifier corresponding to the security challenge presented to the user, which may be used to identify the security challenge and the expected response.

In an embodiment, if the user is successfully authenticated and the bypass token has been accepted, the authentication system enables user access to the requested resources of the computing resource service provider via the browser application 106. For instance, the authentication system may cause the webpage to be updated to present additional information or access to resources of the computing resource service provider. For instance, the computing resource service provider, in response to a notification from the authentication system that the user has been authenticated, may transmit data associated with webpages that may be used by the user to access the requested resources of the computing resource service provider. The client device 102, in response to receiving this data, may cause the browser application 106 to present, via a display element of the client device 102, these webpages, fulfilling the user's request.

In an embodiment, if the user cannot be successfully authenticated as a result of an issue with its provided credential information, the authentication system re-prompts the user, via the user identity information field 108 of the webpage, for its credential information. Additionally, the authentication system may determine whether the bypass token previously provided by the browser application 106, via the client device 102, is still valid. For instance, the bypass token may specify an expiration time that, once reached, results in the bypass token being expired. Additionally, or alternatively, the bypass token may specify one or more conditions that, if satisfied, may result in the bypass token being expired. For example, the bypass token may specify that if the user cannot be successfully authenticated a threshold number of times, the bypass token becomes invalid.

If the authentication system determines that the bypass token is invalid, the authentication system may transmit data to the client device 102 to cause the browser application 106 to present a security challenge within the security challenge field 110. This security challenge may be similar to the security challenge previously removed by the browser application 106 in response to obtaining the bypass token from the security challenge system. Alternatively, this security challenge may be substantially different from the previously presented security challenge. For instance, the new security challenge may include an alternative CAPTCHA challenge, a security question, a request for a one-time password, a request for a proof of work, a response to a DCQ, and/or any combination of the aforementioned security challenges. However, if the authentication system determines that the bypass token is valid, the authentication system may prompt the user, via the browser application 106, for its credential information without presenting a security challenge via the security challenge field 110. Thus, the user may not be re-prompted for a response to a security challenge during the validity period of the bypass token.

Figure 2:
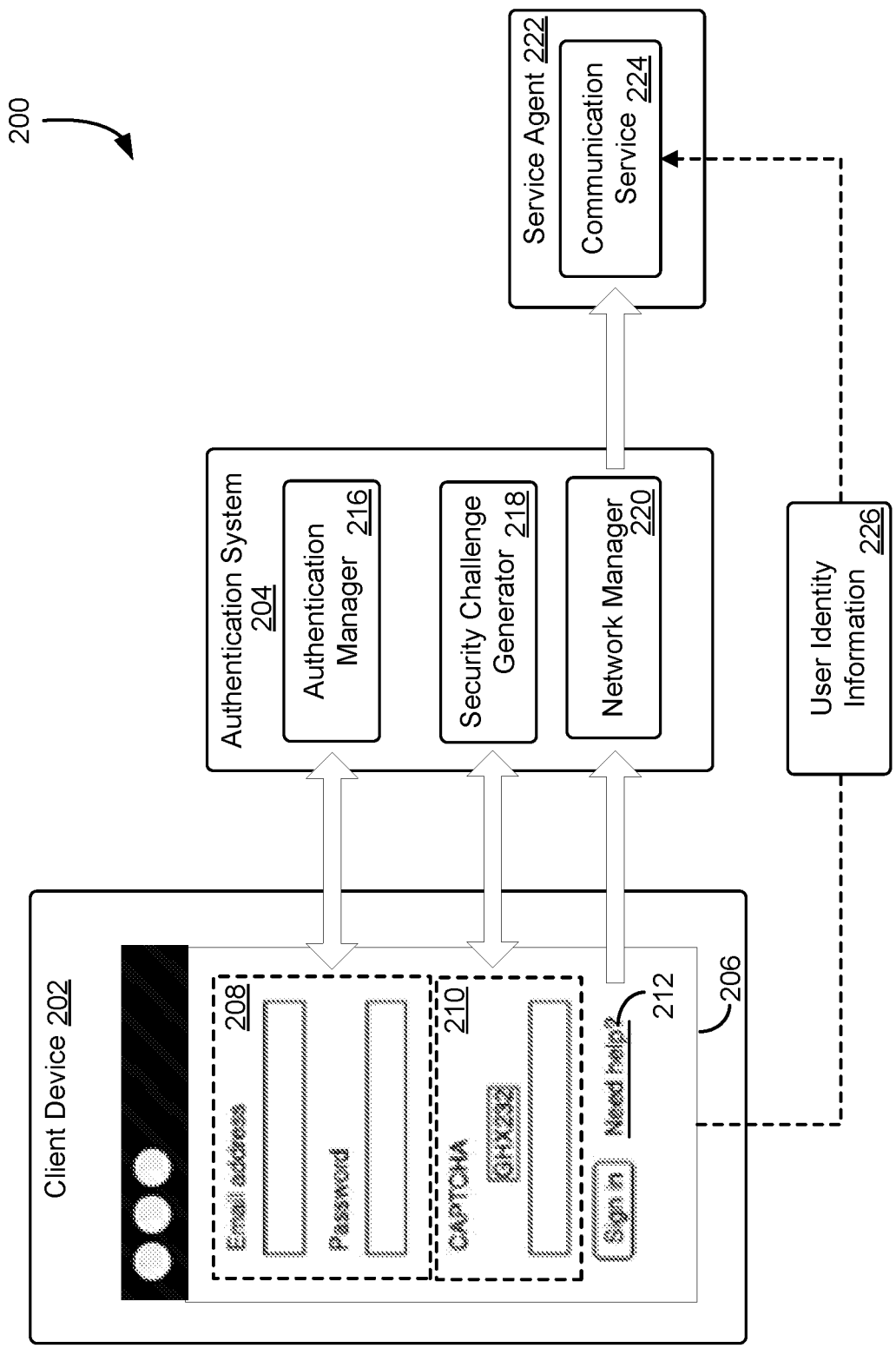
FIG. 2 shows an illustrative example of a system in which an authentication system initiates a communications session between a client device and a service agent to enable a user, through the client device, to request bypass of a security challenge in accordance with at least one embodiment.

FIG. 2 shows an illustrative example of a system 200 in which an authentication system 204 initiates a communications session between a client device 202 and a service agent 222 to enable a user, through the client device 202, to request bypass of a security challenge in accordance with at least one embodiment. In the system 200, a user may utilize a browser application 206, via a client device 202, to navigate to a webpage or other information presentable via the display element of the client device 202. For instance, the user may provide, via the browser application 206, a URI corresponding to the requested webpage. The client device 202 may utilize this URI, in conjunction with a DNS server, to identify a server that maintains the webpages associated with the URI. This server may transmit the data associated with the webpages to the client device 202, which may present the webpages to the user via a display element of the client device 202 through the browser application 206, fulfilling the user's request.

In an embodiment, the client device 202 transmits identifying information corresponding to the user of the client device 202 and of the client device 202 itself to an authentication system 204 that maintains the server that maintains the webpages associated with the webpages requested by the user. The authentication system 204 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. In response to obtaining the identifying information from the client device 202, the authentication system 204, via an authentication manager 216, determines what credential information may be required for authentication of the user. The authentication manager 216 may be implemented as a process or other executable code that, if executed, determines what credential information or other information is required of a user that may be utilized for authentication of the user. Further, the authentication manager 216 may generate data that, if processed by the browser application 206, may cause the browser application 206 to present a user identity information field 208 within the webpage presented to the user. Through the user identity information field 208, a user may be required to provide its electronic mail address and a corresponding password, as illustrated in FIG. 2, which may be verified by the authentication manager 216. Through the user identity information field 208, a user may provide its credential information for submission to the authentication system 204.

In an embodiment, the authentication system 204, via a security challenge generator 218, processes identifying information (e.g., an Internet Protocol (IP) address of the client device 202, cookies, etc.) from the client device 202 that may be useful in determining a set of characteristics of the particular client device 202. The security challenge generator 218 may be implemented as a process or other executable code that, if executed, determines, based on the identifying information provided by the client device 202 and past history of the user and client device 202, determines what security challenges are to be presented to the user of the client device 202 for authentication of the user. For instance, the authentication system may utilize this identifying information to identify any past activity performed by the client device 202 and, based on this past activity, determine a level of suspicion that the client device 202 is actually a bot or other automated process. Additionally, the information provided by the client device 202 may be utilized to determine whether the client device 202 is part of a botnet. For instance, if the security challenge generator 218 determines that a significant number of requests emanate from a particular IP address and these requests occur with great frequency, the security challenge generator 218 may suspect that this particular client device 202 may be part of a botnet.

In an embodiment, based on an analysis of the identifying information provided by the client device 202 and past interactions and history of the client device 202, the security challenge generator 218 selects one or more security challenges to be presented to the user from a variety of CAPTCHA challenges or other security challenges. These security challenges may be used to distinguish a legitimate user from an automated agent or automated process. The security challenge generator 218 may transmit data associated with a CAPTCHA challenge or other security challenges to the client device 202, which may present the CAPTCHA challenge or other security challenges to the user via a display element of the client device 202 through the browser application 206. The CAPTCHA challenge or other security challenges may be presented on the webpage, for instance, through a security challenge field 210. The user of the client device 202 may be required to complete the security challenge presented via the security challenge field 210 in order to access other webpages provided by a computing resource service provider or other entity that maintains the webpage and other resources associated with the webpage.

As noted above, the authentication system 204 may provide, to the client device 202, a URI corresponding to a computing device of a service agent 222 that can be used to request a bypass to the security challenge presented via the security challenge field 210. The client device 202 may use the URI to generate a link 212 that may be presented to the user via the browser application 206. If the user selects the link 212, the client device 202 may transmit a request to a network manager 220 of the authentication system 204 to initiate a communications session between the client device 202 and a communication service 224 of a service agent 222 that may authenticate the user. The network manager 220 of the authentication system 204 may be implemented as a process or other executable code that, if executed, may establish a communications session between the client device 202 and a communication service 224 of the service agent 222. For instance, in response to the request from client device 202, the network manager 220 may identify an available service agent 222 from a plurality of service agents that may process incoming requests to bypass security challenges generated by the security challenge generator 218 and presented to users via their client devices.

The communication service 224 of the service agent 222 may be implemented as a process or other executable code on a computing device of the service agent 222 and that, if executed, may allow the service agent 222 to communicate with the user of the client device 202 over the communications session established by the network manager 220. For instance, if the user selects the link 212, the client device 202 executes programmatic code, provided by the authentication system 204, to display a web widget that the user may utilize to interact with the service agent 222 once the communications session has been established between the client device 202 and the communication service 224 of the service agent 222. Through the web widget, the user may submit its user identity information 226 (e.g., credential information, PII, order history, etc.) that may be used by the service agent 222 to authenticate the user. For instance, through the web widget, the service agent 222 may prompt the user to provide user identity information 226 that may be used to authenticate the user and determine that the user is not a bot. The user identity information 226 may also include the identifying information (e.g., IP address of the client device 202, cookies, etc.) from the client device 202 that may be useful in determining a set of characteristics of the particular client device 202. This additional identifying information may be used by the service agent 222 to determine whether the request to bypass the security challenge is being provided through a client device 202 known to be utilized by an actual user. Through the web widget or through other communications methods provided by the communication service 224 over the communications session established by the network manager 220, the service agent 222 may directly speak with the user and ascertain, based on a conversation with the user, that the user can be authenticated and is not a bot.

Figure 3:
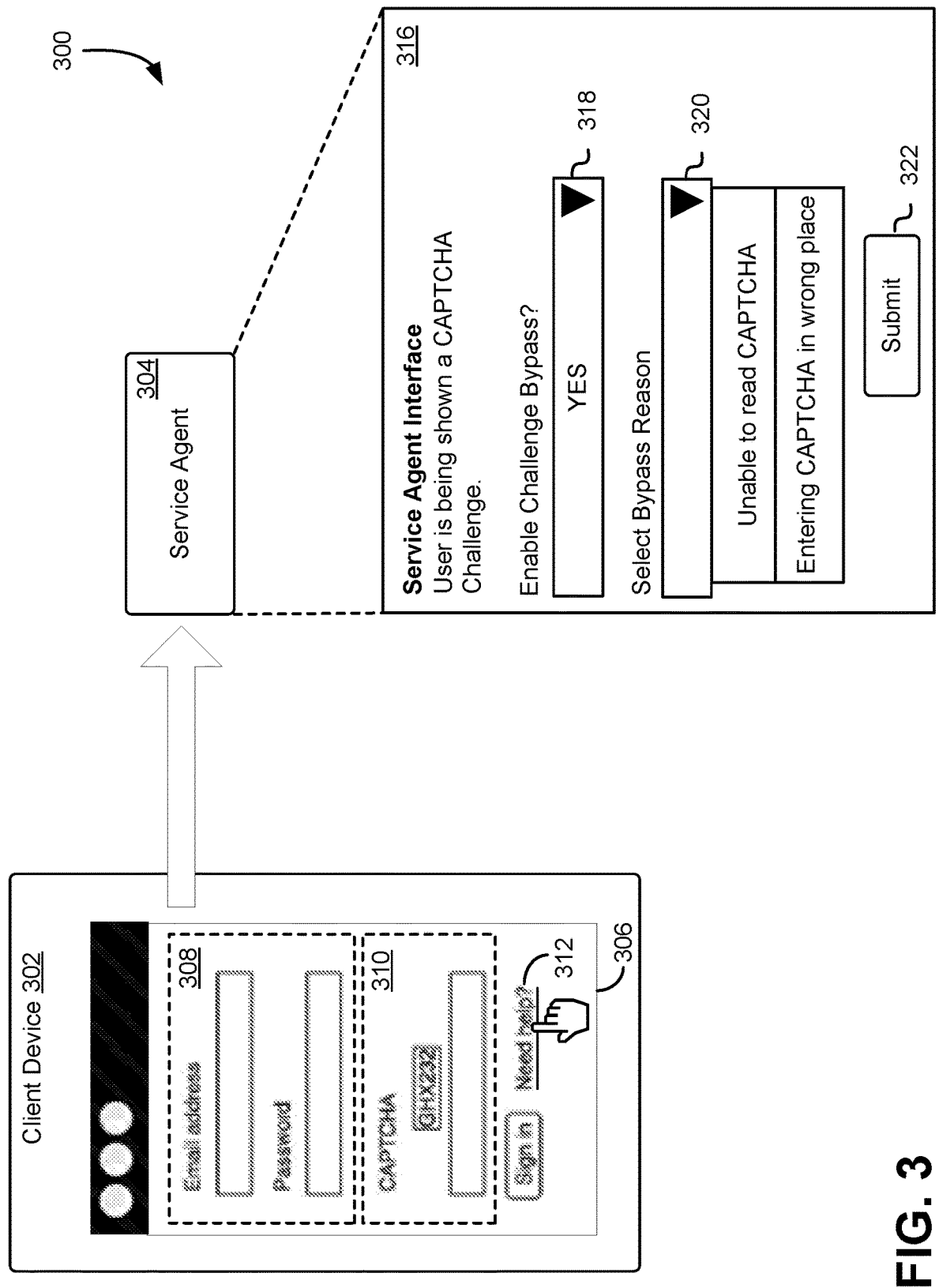
FIG. 3 shows an illustrative example of a system in which a service agent, via an interface and based on user identity information provided via a browser application, determines whether to enable bypass of a security challenge in accordance with at least one embodiment.

FIG. 3 shows an illustrative example of a system 300 in which a service agent 304, via an interface 316 and based on user identity information provided via a browser application 306, determines whether to enable bypass of a security challenge in accordance with at least one embodiment. The system 300 may be similar to that of the system 100 and system 200 described above in connections with FIGS. 1 and 2, respectively. For instance, the system 300 may include, within the browser application 306 of the client device 302, a user identity information field 308, a security challenge field 310, and a link 312 that may be presented to the user via the browser application 306 to submit a request to bypass the security challenge presented via the security challenge field 310. In the system 300, a user of the client device 302 may provide, over a communications session established between the client device 302 and a communication service of the service agent 304, user identity information that may be used by the service agent 304 to authenticate the user and to determine whether the user may bypass a security challenge presented to the user via the security challenge field 310 in the website presented via the browser application 306. For instance, the service agent 304 may ask the user, via the communications session, various questions regarding the user's identity, the user's order history, and the like to ascertain whether the user can be authenticated and, if so, whether the user should be permitted to bypass the security challenge presented via the security challenge field 310.

In an embodiment, the service agent 304 is presented with an interface 316, through which the service agent 304 may indicate whether the user is permitted to bypass the security challenge presented via the security challenge field 310. For instance, the interface 316 may include a challenge bypass drop-down menu 318, through which the service agent 304 may specify whether the user may bypass the security challenge presented via the security challenge field 310. If the service agent 304 specifies, through the challenge bypass drop-down menu 318, that the user is not permitted to bypass the security challenge presented via the security challenge field 310, the user may be required to complete the security challenge presented via the security challenge field 310 in order to proceed.

However, if the service agent 304 specifies, through the challenge bypass drop-down menu 318, that the user is authorized to bypass the security challenge presented via the security challenge field 310, the service agent interface 316 may be updated to present to the service agent 304 a security challenge bypass reason drop-down menu 320. Through the security challenge bypass reason drop-down menu 320, the service agent 304 may be presented with various options corresponding to possible reasons for which the bypass of the security challenge has been authorized. For instance, through the security challenge bypass reason drop-down menu 320, the service agent 304 may indicate that the user of the client 302 is unable to read the CAPTCHA challenge or other security challenge presented to the user via the security challenge field 310. Alternatively, the service agent 304 may indicate, through the security challenge bypass reason drop-down menu 320, that the user has provided the response to the security challenge presented via the security challenge field 310 in the wrong location on the webpage (e.g., within the user identity information field 308, within another field presented on the webpage, etc.). In some instances, the service agent 304 may not be required to provide a reason, via the security challenge bypass reason drop-down menu 320, for authorizing a bypass to the security challenge presented via the security challenge field 310.

In an embodiment, the information provided via the security challenge bypass reason drop-down menu 320 is used by the security challenge system to determine the efficacy of the security challenges presented to users via the security challenge field 310. For instance, the security challenge system may evaluate responses from the various service agents that interact with users to determine whether a vast number of users are experiencing issues in reading the security challenges being presented to them via the security challenge field 310. If so, the security challenge system may select alternative security challenges that may be presented to users or otherwise modify the existing security challenges to make them more legible or otherwise completable by these users. Similarly, if the service agents are indicating that users are provided responses to the security challenges in the wrong location within the website, the security challenge system may determine an alternative location for placement of the security challenge field 310 and/or the security challenges to reduce the likelihood that a user may provide a response to the security challenge in the wrong location on the website. Thus, the reasons indicated via the security challenge bypass reason drop-down menu 320 may be used to obtain metrics with regard to completion of the security challenges presented to users via the security challenge field 310 and to modify the security challenges based on these metrics.

The service agent interface 316 may include a submit button 322, which the service agent 304 may use to submit a request to a security challenge system to enable the bypass of the security challenge presented via the security challenge field 310 should the service agent 304 provide authorization for such a bypass. Alternatively, if the service agent 304 determines that the security challenge should not be bypassed, selection of the submit button 322 may cause the service agent interface 316 to provide an indication to the security challenge system that the user is still required to complete the security challenge presented via the security challenge field 310. As described in greater detail below, if the service agent 304 indicates that the user is authorized to bypass the security challenge, the security challenge system may issue a bypass token to the client device 302 that may cause the client device 302, through the browser application 306, to remove the security challenge field 310.

Figure 4:
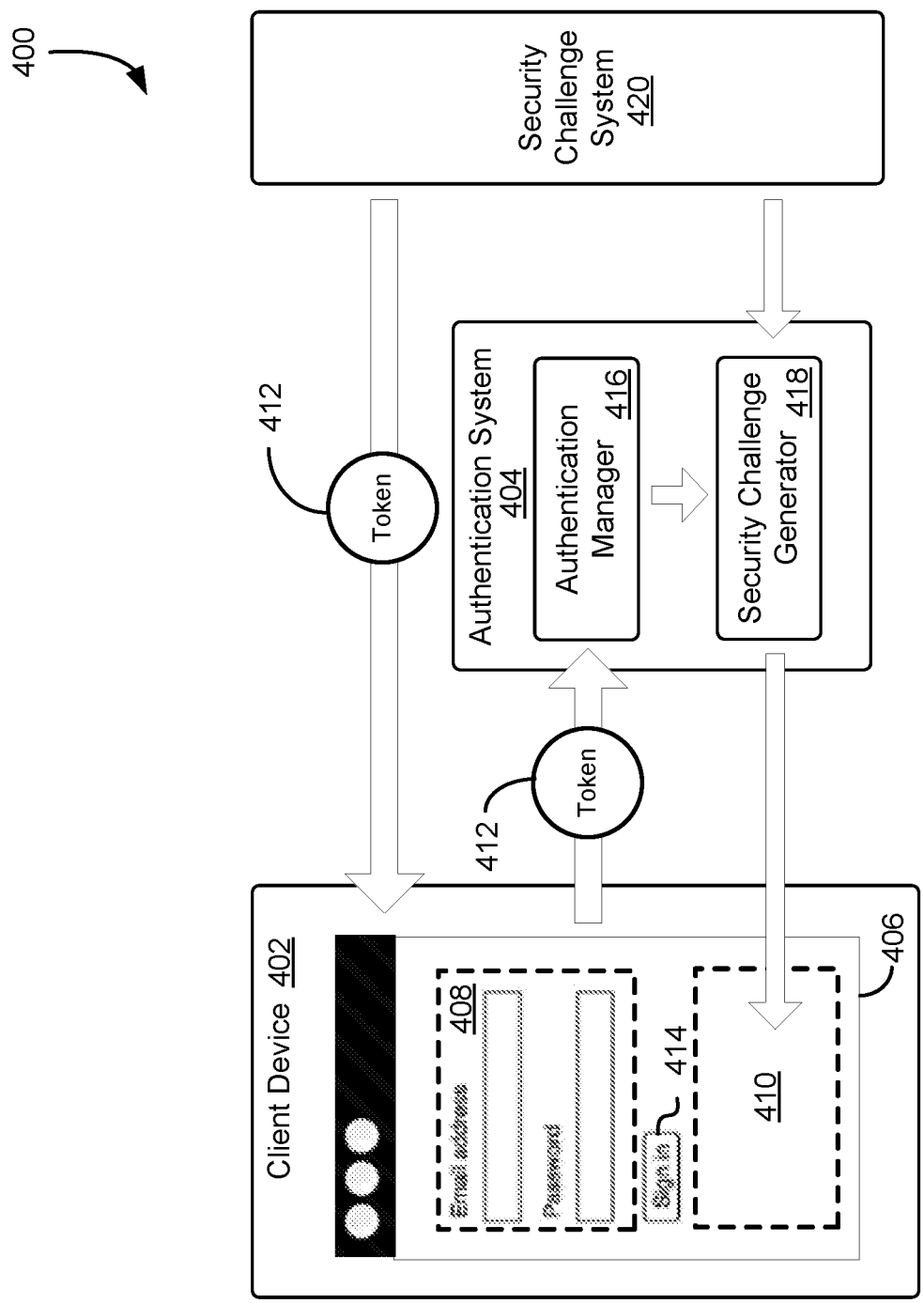
FIG. 4 shows an illustrative example of a system in which an authentication system removes a security challenge from an interface of a client device in response to obtaining a valid bypass token from the client device for bypassing the security challenge in accordance with at least one embodiment.

FIG. 4 shows an illustrative example of a system 400 in which an authentication system 404 removes a security challenge from an interface of a client device 402 in response to obtaining a valid bypass token 412 from the client device 402 for bypassing the security challenge in accordance with at least one embodiment. In the system 400, a security challenge system 420 may issue a bypass token 412 to a client device 402 in response to a request from a service agent to enable the user of the client device 402 to bypass a security challenge presented via a security challenge field 410 on the website presented on a browser application 406 of the client device 402. As noted above, a user of the client device 402 may submit a request to a service agent to bypass a security challenge presented to the user via the security challenge field 410. In response to the request, the service agent may request, from the user, user identity information that may be used by the service agent to authenticate the user and determine whether the user may bypass the security challenge being presented. The service agent may evaluate the provided user identity information and, if it determines that the user may bypass the security challenge being presented via the security challenge field 410, transmits a request to the security challenge system 420 to issue a bypass token 412 to the client device 402.

The security challenge system 420 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. The request from the service agent may specify a unique session identifier corresponding to the webpage session of the user of the client device 402. This unique session identifier may be used by the security challenge system 420 to identify the security challenge presented to the user of the client device 402, the solution to the security challenge, the configuration of the client device 402 and the browser application 406, and the like. Based on the information associated with the session identifier provided by the service agent, the security challenge system 420 may determine the parameters of the bypass token 412. For instance, if the security challenge system 420 determines that the browser application 406 does not support JavaScript, the security challenge system 420 may determine that the bypass token 412 is to include a skeleton key or other cryptographic information that may be used to resolve the security challenge presented to the user. Alternatively, if the security challenge system 420 determines that the browser application 406 supports JavaScript, the security challenge system 420 may generate a bypass token 412 that may be used by the browser application 406 to remove the security challenge field 410 and, hence, the security challenge from the webpage. The security challenge system 420 may transmit the bypass token 412 to the client device 402 to allow the browser application 406 to remove or otherwise bypass the security challenge presented via the security challenge field 410.

In an embodiment, in response to obtaining the bypass token 412 from the security challenge system 420, the browser application 406 may identify the UI elements of the security challenge presented within the security challenge field 410 and remove these from the webpage. Thus, from the user perspective, the security challenge field may disappear from the webpage viewable through the display element of the client device 402. Alternatively, in an embodiment, the browser application 406 transmits, via the client device 402, the bypass token 412 to the authentication manager 416 of the authentication system 404 to request removal of the security challenge field 410 and, hence, the security challenge from the webpage. In response to obtaining the bypass token 412 from the browser application 406, the authentication manager 416 may provide the bypass token to the security challenge generator 418, which may evaluate the bypass token 412 to determine whether it is valid. For instance, the bypass token 412 may specify an expiration time that, once reached, results in the bypass token 412 being expired. Additionally, or alternatively, the bypass token may specify one or more conditions that, if satisfied, may result in the bypass token 412 being expired. For example, the bypass token 412 may specify that if the user cannot be successfully authenticated a threshold number of times, the bypass token 412 becomes invalid. If the bypass token 412 includes a digital signature of the security challenge system 420 or of the service agent that authorized issuance of the bypass token 412, the security challenge generator 418 may transmit the bypass token 412 and the digital signature to the security challenge system 420 for validation.

If the security challenge generator 418 determines that the bypass token 412 is valid, the security challenge generator 418 may transmit executable instructions to the browser application 406 that, if executed by the browser application 406, cause the browser application 406 to identify and remove the UI elements of the security challenge presented within the security challenge field 410 and remove these from the webpage. The user of the client device 402 may, thus, be required to provide only its credential information or other information that may be used to authenticate the user via the user identity information field 408 and select the sign in button 414 to submit this information for authentication of the user. In some embodiments, rather than having the security challenge disappear from the webpage, the user can ignore the security challenge and select the sign in button 414 to submit its credential information to the authentication manager 416. In response to selection of the sign in button 414, the browser application 406 may transmit the submitted credential information and the bypass token 412 to the authentication manager 416. If the bypass token 412 is invalid and/or the user has provided invalid credential information, the security challenge generator 418 may transmit executable instructions to the browser application 406 that, if executed by the browser application 406, cause the browser application 406 to prompt the user for valid credential information via the user identity information field 408 and for a response to the security challenge via the security challenge field 410.

In an embodiment, if the user provides invalid credential information or the authentication manager 416 is otherwise unable to authenticate the user, the security challenge generator 418 determines whether the bypass token 412 provided with the credential information is still valid. As noted above, the bypass token 412 may specify an expiration time that, once reached, results in the bypass token 412 being expired. Additionally, or alternatively, the bypass token may specify one or more conditions that, if satisfied, may result in the bypass token 412 being expired. For example, the bypass token 412 may specify that if the user cannot be successfully authenticated a threshold number of times, the bypass token 412 becomes invalid. If the bypass token 412 is no longer valid (e.g., has expired, user has provided invalid credential information a threshold number of times, etc.), the security challenge generator 418 may reintroduce, via the security challenge field 410, a new security challenge that the user may be required to complete in order to proceed. However, if the bypass token 412 is still valid, the security challenge generator 418 may forego presentation of a new security challenge via the security challenge field 410. Thus, the user may only be required to provide its credential information within the user identity information field 408 to proceed, so long as the bypass token 412 is valid.

Figure 5:
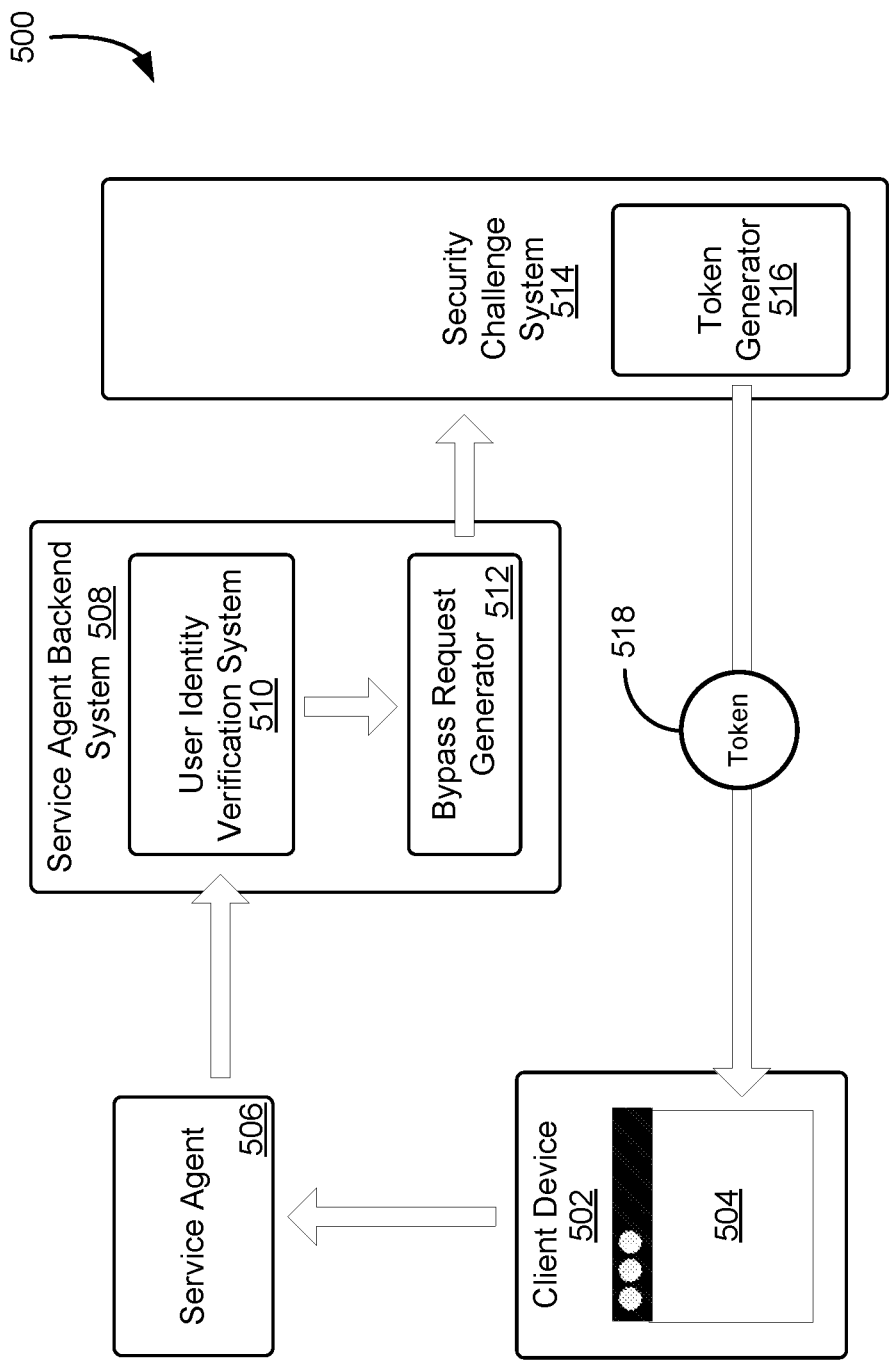
FIG. 5 shows an illustrative example of a system in which a bypass token is issued to a client device in response to successful verification of user identity information of a user of the client device in accordance with at least one embodiment.

FIG. 5 shows an illustrative example of a system 500 in which a bypass token 518 is issued to a client device 502 in response to successful verification of user identity information of a user of the client device 502 in accordance with at least one embodiment. In the system 500, a client device 502 submits a request to a service agent 506 to bypass a security challenge on a webpage presented via a browser application 504 of the client device 502. As noted above, a user of the client device 502 may provide, over a communications session established between the client device 502 and a communication service of the service agent 506, user identity information that may be used by the service agent 506 to authenticate the user and to determine whether the user may bypass a security challenge presented to the user via the security challenge field in the website presented via the browser application 504. For instance, the service agent 506 may ask the user, via the communications session, various questions regarding the user's identity, the user's order history, and the like to ascertain whether the user can be authenticated and, if so, whether the user should be permitted to bypass the security challenge presented via the security challenge field.

In an embodiment, the service agent 506 provides any obtained user identity information to a user identity verification system 510 of a service agent backend system 508 for validation. The service agent backend system 508 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. The service agent backend system 508 may include the user identity verification system 510, which may be implemented as a process or other executable code on service agent backend system 508 and that, if executed, evaluates user identity information from a user to determine its validity and to determine whether it is sufficient for enabling the bypass of a security challenge presented via the browser application 504.

The user identity verification system 510 may evaluate responses provided by the user in response to questions and other requests provided by the service agent 506 to the user. As noted above, the service agent 506 may ask the user, via the communications session, various questions regarding the user's identity, the user's order history, and the like. The service agent 506 may record these responses and provide these to the user identity verification system 510. The user identity verification system 510 may access the user's account or other repository of user information to determine the veracity of these responses. For instance, if the service agent 506 asks a user for detailed regarding its order history, the user identity verification system 510 may evaluate the responses by the user to determine whether they correspond to the user's actual order history specified in the user's account or other repository of user information. Based on an evaluation of the user's responses to the questions or other requests made by the service agent 506, the user identity verification system 510 may determine whether the user may bypass the security challenge presented on the webpage via the browser application 504.

If the user identity verification system 510 determines that the user should still be required to respond to the security challenge, the user identity verification system 510 may transmit a notification to the service agent 506 to indicate that the request to bypass the security challenge should be denied. The service agent 506 may inform the user that it is required to complete the security challenge to proceed. Alternatively, the service agent 506 may do nothing and maintain the security challenge as presented via the browser application 504. However, if the service agent backend system 508 determines, based on its evaluation of the user identity information provided by the user to the service agent 506, that the user may bypass the security challenge, the user identity verification system 510 may transmit a request to a bypass request generator 512 to request issuance of a bypass token 518 to the browser application 504 of the client device 502.

The bypass request generator 512 may be implemented as a process or other executable code on service agent backend system 508 and that, if executed, generates and transmits requests to a security challenge system 514 to issue a bypass token 518 to a client device 502 for use in bypassing a security challenge. In response to the request from the user identity verification system 510 to issue a bypass token 518 to the client device 502, the bypass request generator 512 may identify a session identifier corresponding to the webpage session of the user. This session identifier may be provided by the user identity verification system 510 in its request to the bypass request generator 512. Alternatively, the bypass request generator 512 may query the client device 502 to obtain the session identifier and configuration information of the client device 502 and the browser application 504, which may be used to determine what the bypass token 518 is to include in order to remove or otherwise bypass the security challenge.

The bypass request generator 512 may transmit a request to the security challenge system 514 to generate and issue a bypass token 518 to the client device 502 to enable removal or bypass of the security challenge. In response to the request, the security challenge system 514 may evaluate the session associated with the client device 502 and the elements of the security challenge presented to the user via the browser application 504 to determine the parameters of the bypass token 518 to be issued to the client device 502. For instance, if the security challenge system determines that the browser application 504 does not support JavaScript, the security challenge system 514 may determine that the bypass token 518 is to include a skeleton key or other cryptographic information that may be used to resolve the security challenge presented to the user. Alternatively, if the security challenge system 514 determines that the browser application 504 supports JavaScript, the security challenge system 514 may generate a bypass token 518 that may be used by the browser application 504 to remove the security challenge field and, hence, the security challenge from the webpage.

The security challenge system 514 may provide these parameters to a token generator 516 for generation and issuance of the bypass token 518. The token generator 516 may be implemented as a process or other executable code on the security challenge system 514 and that, if executed, generates the bypass token 518 and issues the bypass token 518 to the client device 502 for use by the browser application 504. In an embodiment, the token generator 516 stores the bypass token 518 and is issued in response to a request from the browser application 504 for the bypass token 518. As noted above, the webpage presented via the browser application 504 may include HTML code, CSS, JavaScript, and/or other technologies usable to present, via a display element, various elements of the webpage in a manner that may be understandable to a user. In an embodiment, the webpage includes a programmatic script that is executed by the browser application 504 and causes the browser application 504 to query the security challenge system 514 to determine whether a bypass token 518 is available for removal or bypass of the security challenge presented via the security challenge field. If a bypass token 518 is available, the browser application 504 may obtain the bypass token from the security challenge system 514 via the token generator 516. Alternatively, the token generator 516 may push the bypass token 518 to the browser application 504 once the bypass token 518 has been generated. In an embodiment, if the browser application 504 does not support the use of programmatic scripts (e.g., JavaScript, etc.), the token generator 516 transmits a skeleton key or other information that may be used to automatically complete the security challenge presented in the security challenge field.

Figure 6:
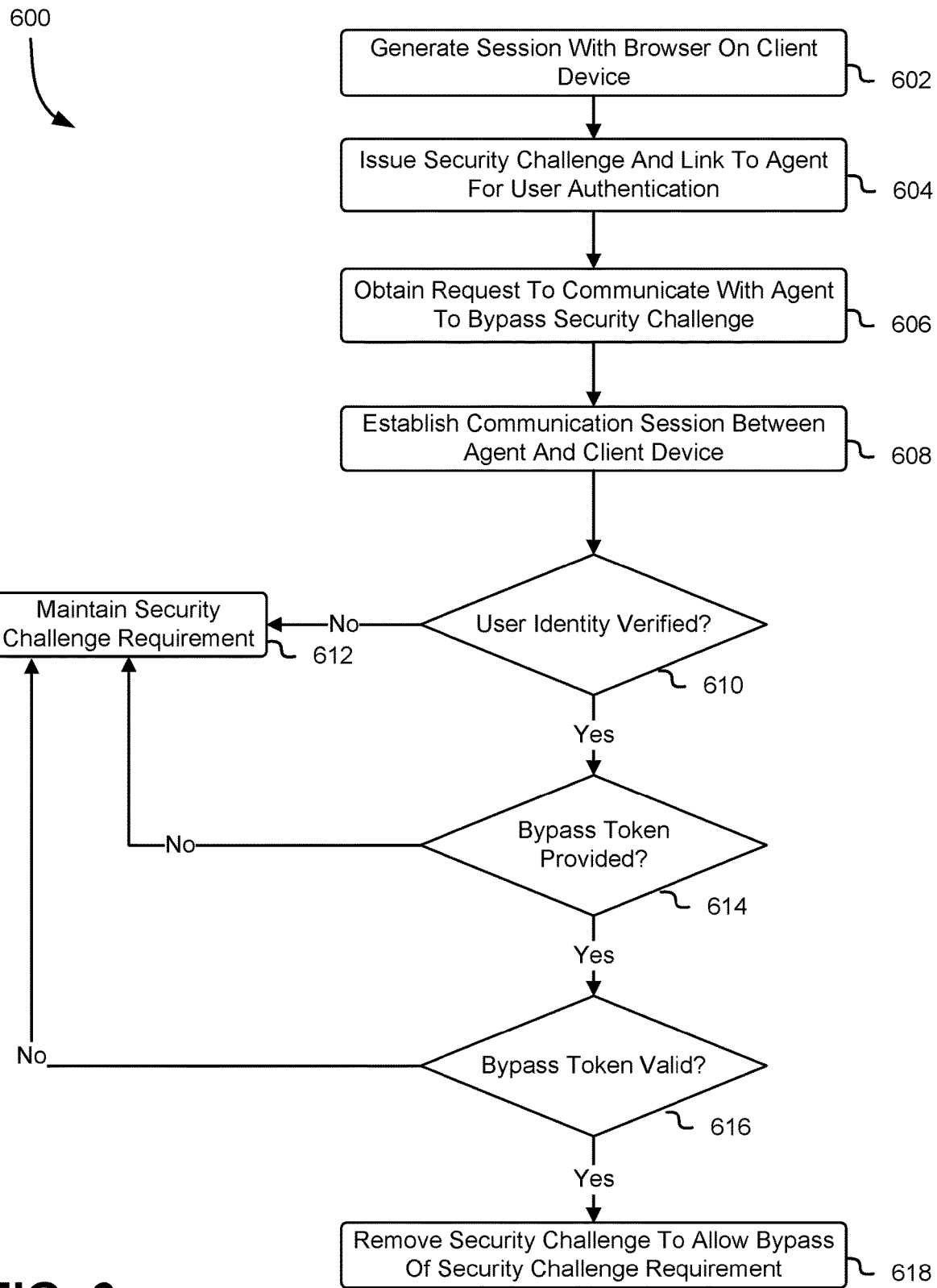
FIG. 6 shows an illustrative example of a process for establishing a communications session between a client device and an agent for removing a security challenge from a browser interface of a client device in accordance with at least one embodiment.

FIG. 6 shows an illustrative example of a process 600 for establishing a communications session between a client device and an agent for removing a security challenge from a browser interface of a client device in accordance with at least one embodiment. The process 600 may be performed by an authentication system of a service or other entity that provides webpages and other resources to users via their browser applications. In an embodiment, the authentication system generates 602 a webpage session with a browser application installed on a user's client device. For instance, a user of a client device may access, via the client device, a webpage or other information presentable through a display element of the client device. The user may use a browser application, via the client device, to navigate to a webpage or other information presentable via the display element of the client device. For instance, the user may provide, via the browser application, a URI corresponding to the requested webpage. The client device may utilize this URI, in conjunction with a DNS server, to identify a server that maintains the webpages associated with the URI. This server may include the authentication system that may transmit the data associated with the webpages to the client device to generate this new session.

As part of the webpage session, the authentication system may issue 604 a security challenge and a link usable to request a communications session for user authentication to the browser application for presentation on the webpage. For instance, the authentication system may utilize identifying information of the user to determine which one or more security challenges the user is to complete in order to allow the user to proceed. As an example, the authentication system may utilize this the identifying information to identify any past activity performed by the client device and, based on this past activity, determine a level of suspicion that the client device is actually a bot or other automated process. Additionally, the information provided by the client device may be utilized to determine whether the client device is part of a botnet. Based on this level of suspicion, the authentication system may select the one or more security challenges to be presented to the user. Additionally, the authentication system may provide, to the client device, a URI corresponding to a computing device of a service agent that can be used to request a bypass to the security challenge. The client device may generate, in response to obtaining the URI, a link that may be presented to the user via the browser application.

If the user selects the link, the client device may transmit a request to the authentication system to establish a communications session with a service agent, through which the user can request a bypass to the security challenge presented to the user. Accordingly, the authentication system may obtain 606 a request, from the user via its client device, to communicate with a service agent to bypass the security challenge. The request may include identifying information of the user and/or of the user's client device such as the IP address of the client device, the user name of the user, and the like. In response to the request, the authentication system may establish 608 a communications session between the user's client device and a computing device or other service of a service agent. For instance, in response to the request from client device, the authentication system may identify an available service agent from a plurality of service agents that may process incoming requests to bypass security challenges generated by the security challenge generator and presented to users via their client devices. The authentication system may establish the communications session with the selected service agent, which may communicate with the user to determine whether the user may bypass the security challenge.

As noted above, the service agent may determine 610 whether the user can bypass the security challenge based on an evaluation of the user identifying information provided to the service agent throughout the duration of the communications session between the client device of the user and the computing device of the service agent. If the service agent determines that the user cannot be authenticated or otherwise should not be permitted to bypass the security challenge, the authentication system may maintain 612 the security challenge for the user. Thus, the user may be required to successfully complete the security challenge in order to proceed. However, if the user's identity is verified by the service agent, the authentication system may determine 614 whether a bypass token has been provided (e.g., issued) to the client device. For instance, if the service agent determines that the user may bypass the security challenge, the service agent may identify the session associated with the client device and the elements of the security challenge presented to the user via the browser application. Further, the service agent may transmit a request to a security challenge system of the computing resource service provider to request creation of a bypass token usable to bypass the security challenge.

If the security challenge system does not issue a bypass token to the client device of the user (e.g., the bypass token has not been pushed to the client device, the client device has not queried the security challenge system for the bypass token, etc.), the authentication system may maintain 612 the security challenge requirement for the user. However, if a bypass token is issued to the client device, the authentication system may continue to maintain the security challenge requirement until the bypass token is provided to the authentication system in a request to remove the security challenge from the webpage, at which time the authentication system may determine 616 whether the bypass token is valid. In response to obtaining the bypass token from the browser application of the client device, the authentication system may evaluate the bypass token to determine whether it is valid. For instance, the bypass token may specify an expiration time that, once reached, results in the bypass token being expired. Additionally, or alternatively, the bypass token may specify one or more conditions that, if satisfied, may result in the bypass token being expired.

If the authentication system determines that the bypass token is valid, the authentication system may transmit executable instructions to the browser application that, if executed by the browser application, cause the browser application to identify the UI elements of the security challenge and remove 618 these from the webpage. The user of the client device may, thus, be required to provide only its credential information or other information that may be used to authenticate the user via the user identity information field. However, if the provided bypass token is not valid (e.g., has expired, one or more conditions for use of the bypass token are not satisfied, etc.), the authentication system may maintain 612 the security challenge requirement for the user, such that the user may need to successfully complete the security challenge in order to proceed.

Figure 7:
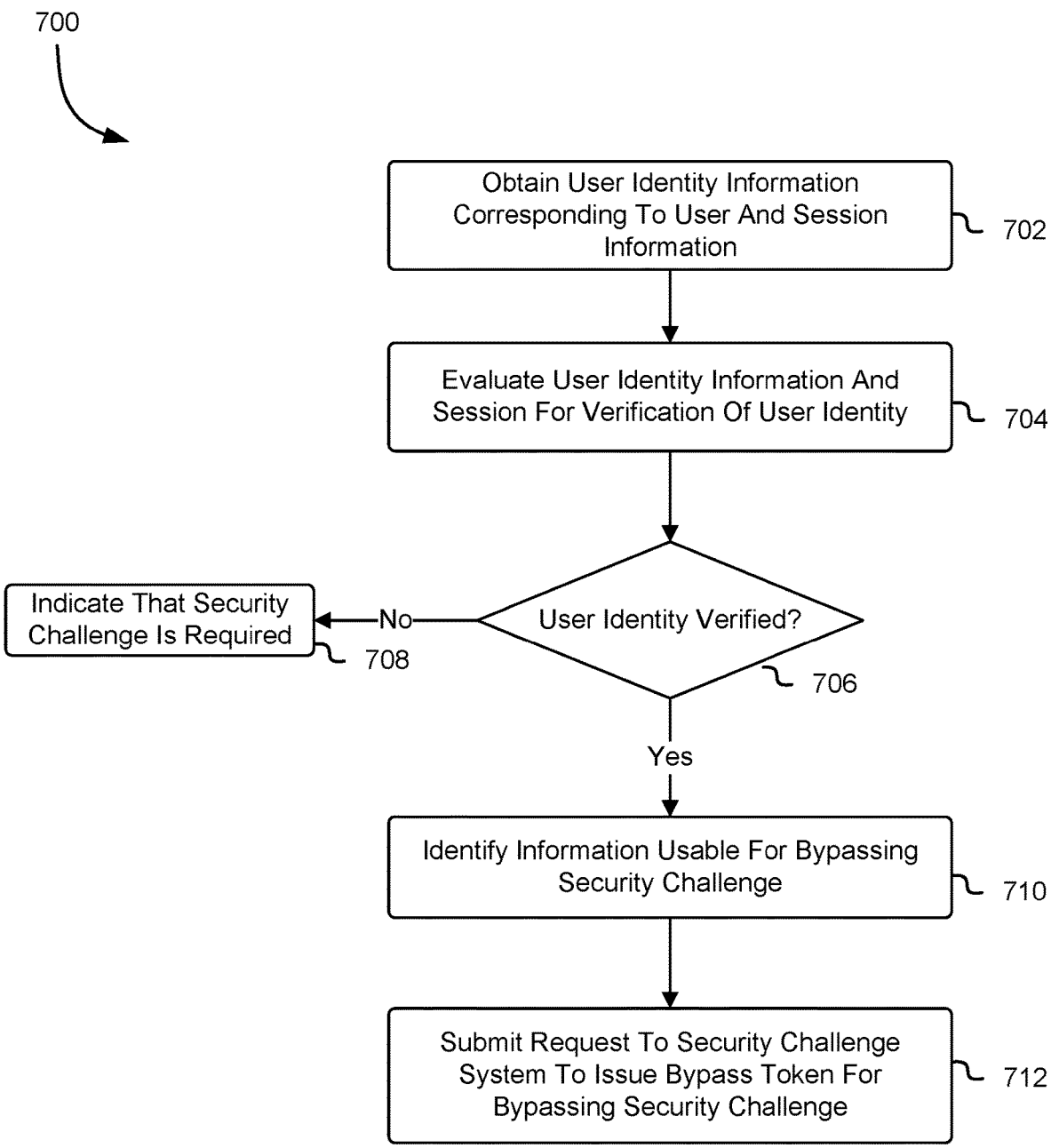
FIG. 7 shows an illustrative example of a process for verifying user identity information to determine whether to submit a request for issuance of a bypass token to a client device for bypassing a security challenge in accordance with at least one embodiment.

FIG. 7 shows an illustrative example of a process 700 for verifying user identity information to determine whether to submit a request for issuance of a bypass token to a client device for bypassing a security challenge in accordance with at least one embodiment. The process 700 may be performed by a service agent associated with a service or other entity that maintains the webpages and other resources that may be available to authenticated users. As noted above, a user of a client device may select a link, presented via a webpage displayed via a browser application of the client device, to request a bypass to a security challenge presented to the user. In response to selection of the link, an authentication system may establish a communications session between the client device and a computing device of the service agent, through which the user and service agent may communicate with one another.

Through the communications session with the user, the service agent may obtain 702 user identity information corresponding to the user and session information corresponding to the session associated with the client device. This user identity information may include credential information of the user, PII of the user, the user's order history, and the like. To obtain the user identity information, the service agent may ask the user various questions for which the responses may include the user identity information usable to authenticate the user. Alternatively, the user may supply its user identity information once the communications session has been established with the service agent. Additionally, the service agent may obtain, from the client device, the session identifier for the webpage session of the user and the parameters of the security challenge that is to be bypassed. The service agent may use the session identifier to obtain the session information corresponding to the session associated with the client device. In response to obtaining the user identity information from the user and the session information, the service agent may evaluate 704 the user identity information and the session information to determine 706 whether the user's identity can be verified (e.g., authenticated). For instance, the service agent may compare the provided user identity information to information stored in the user's account to determine whether the responses provided by the user are accurate. Additionally, the service agent may use the session information (e.g., IP address of the client device, cookies, etc.) from the client device to determine a set of characteristics of the particular client device. This additional identifying information may be used by the service agent to determine whether the request to bypass the security challenge is being provided through a client device known to be utilized by an actual user.

If the service agent determines, based on its evaluation of the provided user identity information and session information, that the user's identity cannot be verified, the service agent may transmit a notification to the authentication system to indicate 708 that the security challenge is still required. This may cause the authentication system to maintain the security challenge requirement for the user such that the user may be required to successfully complete the security challenge in order to proceed. However, if the service agent determines that the user's identity has been verified through evaluation of the provided user identity information, the service agent may identify 710 information usable for bypassing the security challenge. For instance, the service agent may transmit a request to the authentication system to identify the parameters of the security challenge presented to the user for the webpage session. Thus, the service agent may obtain the information usable for bypassing the security challenge from the authentication system. Using the session identifier and the information usable for bypassing the security challenge, the service agent may generate a request to issue a bypass token to the client device to allow the user to bypass the security challenge. The service agent may submit 712 this request to the security challenge system, which may evaluate the provided information to determine whether a bypass token may be issued to the client device to enable the user to bypass the security challenge presented to the user.

Figure 8:
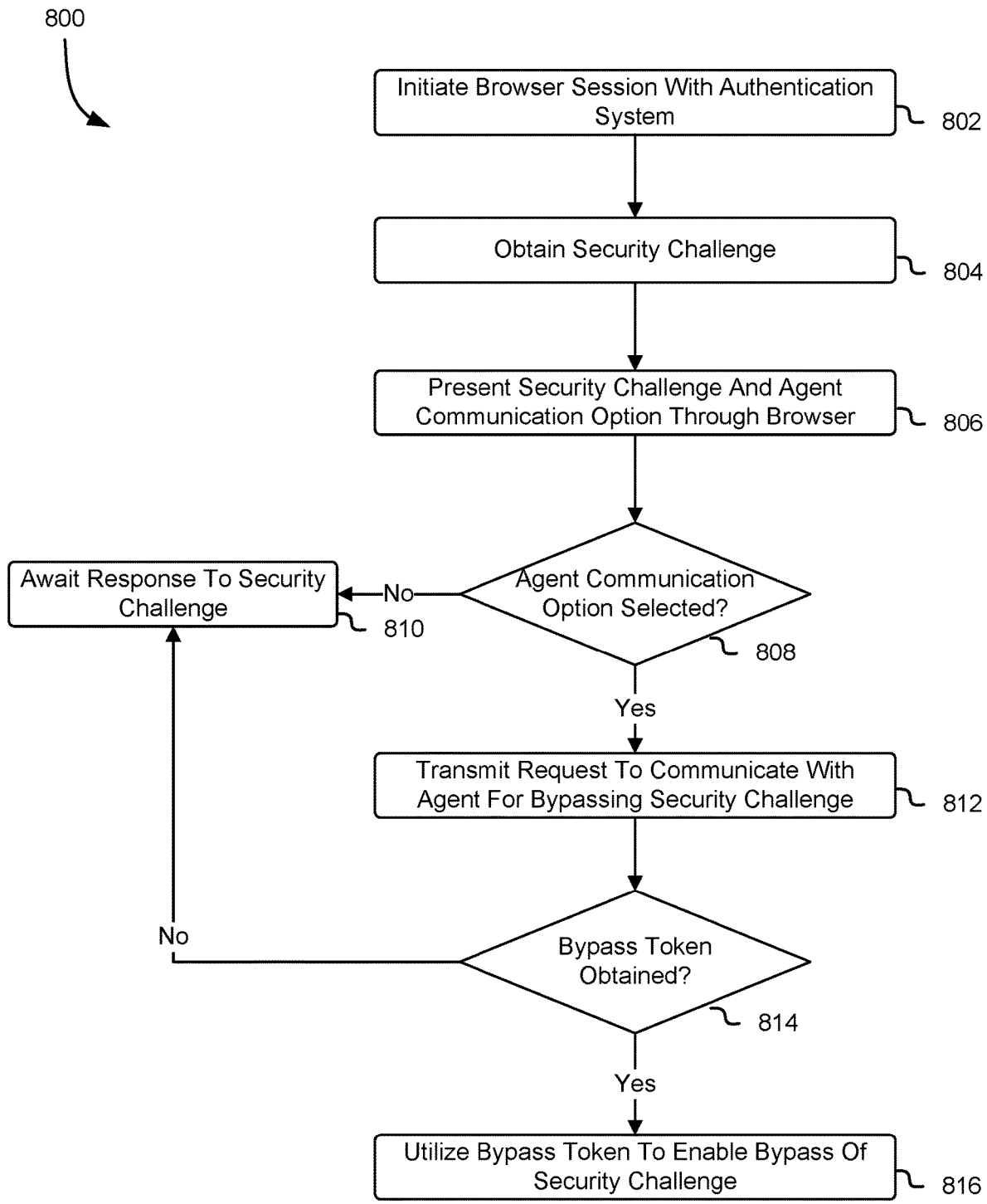
FIG. 8 shows an illustrative example of a process for utilizing a bypass token to bypass a security challenge obtained from an authentication system in accordance with at least one embodiment.

FIG. 8 shows an illustrative example of a process 800 for utilizing a bypass token to bypass a security challenge obtained from an authentication system in accordance with at least one embodiment. The process 800 may be performed by a browser application installed on a client device utilized by a user requesting access to webpages or other resources provided by a service or other entity. As noted above, a user of a client device may access, via the client device, a webpage or other information presentable through a display element of the client device. The user may use a browser application, via the client device, to navigate to a webpage or other information presentable via the display element of the client device. For instance, the user may provide, via the browser application, a URI corresponding to the requested webpage. The client device may utilize this URI, in conjunction with a DNS server, to identify a server that maintains the webpages associated with the URI and initiate 802 a browser session with the authentication system that maintains the server.

This server and the authentication system may transmit the data associated with the webpages to the client device, which may present the webpages to the user via a display element of the client device through the browser application, fulfilling the user's request. In an embodiment, the browser application obtains 804, from the authentication system, a security challenge to be presented to the user. As described above, the authentication system may issue a security challenge and a link usable to request a communications session for user authentication to the browser application for presentation on the webpage. For instance, the authentication system may utilize identifying information of the user to determine which one or more security challenges the user is to complete in order to allow the user to proceed. As an example, the authentication system may utilize this the identifying information to identify any past activity performed by the client device and, based on this past activity, determine a level of suspicion that the client device is actually a bot or other automated process. Additionally, the information provided by the client device may be utilized to determine whether the client device is part of a botnet. Based on this level of suspicion, the authentication system may select the one or more security challenges to be presented to the user. Additionally, the authentication system may provide, to the client device, a URI corresponding to a computing device of a service agent that can be used to request a bypass to the security challenge. The client device may generate, in response to obtaining the URI, a link that may be presented to the user via the browser application. In response to obtaining the security challenge and the URI corresponding to the computing device of the service agent, the browser application may present 806 the security challenge and a link corresponding to the URI to the user.

The browser application may monitor the user's interactions with the UI elements of the webpage to determine 808 whether the user has selected the link (e.g., agent communication option) from the webpage. If the browser application determines that the user has not selected this option, the browser application may await 810 a response from the user to the security challenge presented on the webpage. However, if the user has selected the agent communication option (e.g., link) from the webpage, the browser application may transmit 812 a request to the authentication system to communicate with a service agent to request a bypass to the security challenge. In response to the request, the authentication system may establish a communications session between the client device and a computing device of the service agent, through which the user may provide its user identity information for authentication of the user.

As noted above, if the service agent determines that the user's identity has been verified and that it should be authorized to bypass the security challenge, the service agent may transmit a request to the security challenge system to issue a bypass token to the client device for use in bypassing the security challenge. In an embodiment, the webpage presented to the user via the browser application includes a programmatic script that is executed by the browser application and causes the browser application to query the security challenge system to determine whether a bypass token is available for removal or bypass of the security challenge. If a bypass token is available, the browser application may obtain the bypass token from the security challenge system. Alternatively, the security challenge system may push the bypass token to the browser application once it has been generated in response to the request from the service agent. Thus, the browser application may determine 814 whether the bypass token has been obtained. If the bypass token has not been obtained, the browser application may await 810 a response from the user to the security challenge presented on the webpage.

If the browser application has obtained a bypass token from the security challenge system, the browser application may utilize 816 the bypass token to enable the bypass to the security challenge. For example, if a bypass token is available, the browser application may identify the UI elements of the security challenge presented to the user and remove these from the webpage. In an embodiment, if the browser application does not support the use of programmatic scripts (e.g., JavaScript, etc.), the security challenge system transmits a skeleton key or other information that may be used to automatically complete the security challenge presented to the user. For instance, in response to obtaining a skeleton key, the browser application may use the skeleton key to generate the response to the security challenge and input the response to the security challenge on the webpage. Similarly, if the browser application receives, from the security challenge system, a response to the security challenge presented on the webpage, the browser application may input this response into the corresponding input field to complete the security challenge on behalf of the user.

Figure 9:
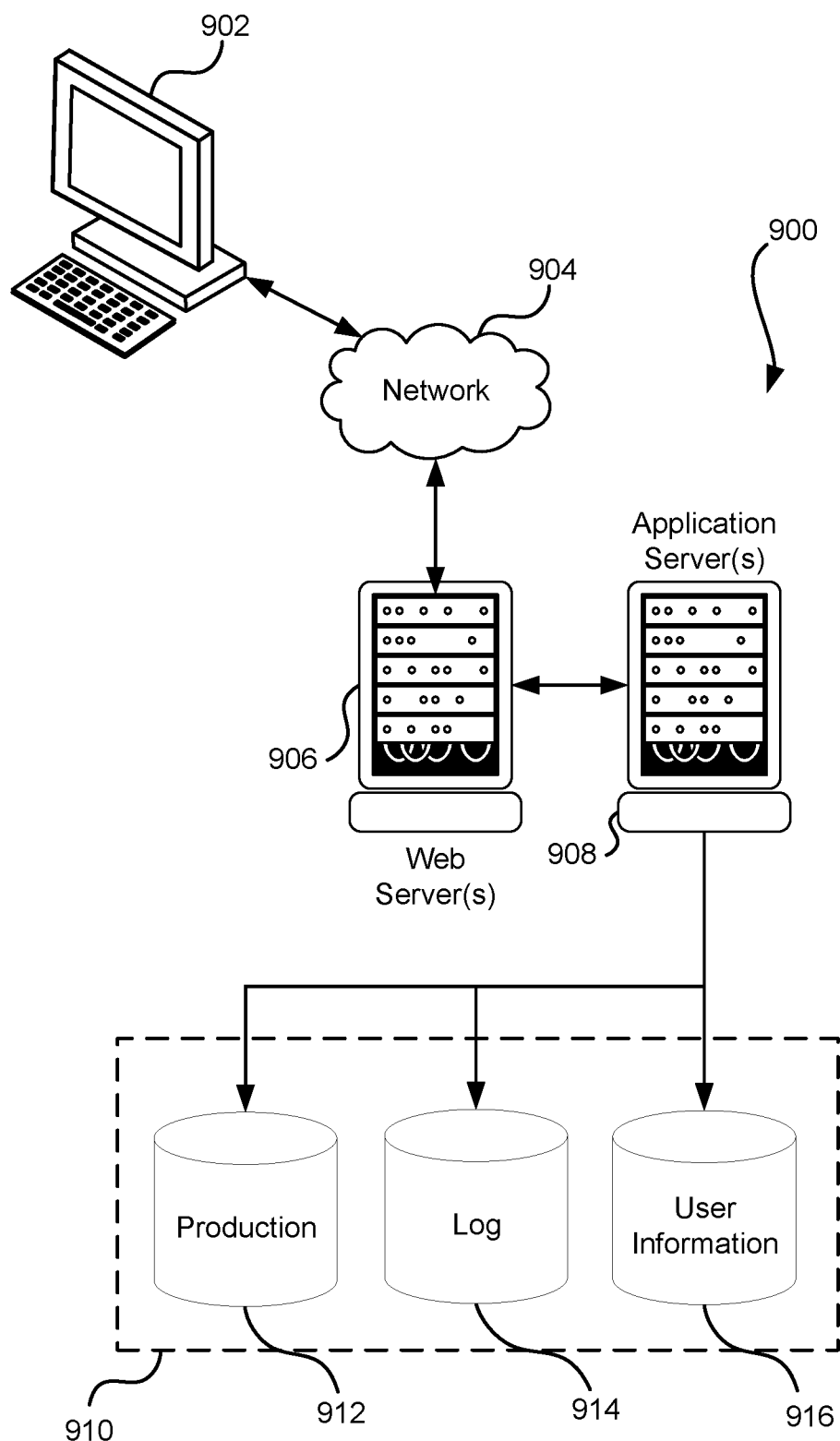
FIG. 9 shows an illustrative example of a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGP") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising at least one computing device configured to implement one or more services, wherein the one or more services:

cause a security challenge to be displayed on a browser of a client device in response to an authentication attempt to access one or more resources of a computer resource service provider, the browser of the client device additionally providing an option for a user of the client device to communicate with an agent for verification of an identity of the user, the security challenge comprising a task to differentiate humans from automated agents;

obtain a first request to bypass the security challenge, the first request submitted by the agent as a result of successful completion of a verification workflow comprising valid authentication information;

provide a notification to another system that manages security challenges, the notification indicating that the identity of the user is successfully verified with the valid authentication information;

obtain, from the other system, a token restricted for use during a session corresponding to bypassing the security challenge displayed on the browser, the token to be submitted by the client device in place of a correct response to the security challenge, the token comprising bypass information that allows bypass of the security challenge without submission of the correct response, the token becoming expired as a result of the user failing to provide the valid authentication information with the token; and forward the token to the client device to cause the security challenge to be removed from being displayed on the browser.

2. The system of claim 1, wherein the token comprises executable instructions that, as a result of being executed by the client device, cause the client device to remove a set of user interface elements associated with the security challenge from display on the browser of the client device.

3. The system of claim 1, wherein the one or more services further:

obtain, in response to selection of the option, a second request from the client device to communicate with the agent for the verification of the identity of the user; and establish a communications session between the client device and a computing device of the agent to allow the user to provide authentication information of the user usable by the agent to verify the identity of the user.

4. The system of claim 1, wherein the token becomes expired if the user fails to provide the valid authentication information a threshold number of times for accessing the one or more resources.

5. A method comprising:

creating a session corresponding to a browser of a computing device in response to the browser accessing a page of a computer resource provider;

causing a security challenge to be displayed on the page;

obtaining, from the computing device, an indication to communicate with an agent instead of submitting a correct response to the security challenge;

permitting communication between a user associated with the computing device and the agent; and as a result of the agent verifying identity of the user using authentication information of the user from the communication, causing the computing device to obtain a bypass token usable for submission by the browser of the computing device as an alternative to the correct response to the security challenge, the bypass token comprising bypass information that permits successful completion of the security challenge without the correct response;

obtaining, from the computing device, the bypass token and the authentication information;

determining that the bypass token is valid and the authentication information is invalid, resulting in a failure to authenticate the user; and in response to the failure, transmitting executable instructions to the computing device that, as a result of being executed by the computing device, cause the computing device to prompt the user for valid authentication information.

6. The method of claim 5, further comprising:

evaluating the bypass information that permits the successful completion of the security challenge without the correct response to determine validity of the bypass information; and as a result of the bypass information being valid, redirecting the browser of the computing device to another page of the computer resource provider.

7. The method of claim 5, further comprising causing a link corresponding to an option for the user associated with the computing device to communicate with the agent for verification of the identity of the user to be displayed on the page, whereby selection of the option results in generation of the indication to communicate with the agent.

8. The method of claim 5, wherein permitting the communication between the user associated with the computing device and the agent includes establishing a communications session between the computing device and another computing device of the agent in response to the indication obtained from the computing device.

9. The method of claim 5, wherein the bypass information that permits the successful completion of the security challenge without the correct response comprises executable instructions that, if executed by the computing device, cause the computing device to remove the security challenge from the page.

10. The method of claim 5, further comprising:

evaluating the bypass information that permits the successful completion of the security challenge without the correct response to determine validity of the bypass information; and as a result of the bypass information being valid, transmitting executable instructions to the computing device that, as a result of being executed by the computing device, cause the computing device to remove the security challenge from the page.

11. The method of claim 5, wherein the bypass token specifies an expiration whereby the bypass token becomes expired as a result of the expiration having occurred.

12. A non-transitory computer-readable storage medium comprising first executable instructions that, as a result of being executed by one or more processors of a computer system, cause the computer system to at least:

obtain, during a session with a first service, a bypass token from a second service that manages security challenges, the second service providing the bypass token as a result of a validation of an identity of a user by the second service, the identity of the user validated by the second service based on valid authentication information provided to an agent of the first service during the session;

use the bypass token to bypass a security challenge without successful completion of the security challenge to access one or more resources provided by the first service, wherein the bypass token expires as a result of the user failing to provide the valid authentication information, with the bypass token, to the first service; and as a result of bypassing the security challenge with the bypass token, obtain access to the one or more resources.

13. The non-transitory computer-readable storage medium of claim 12, wherein the first executable instructions that cause the computer system to use the bypass token to bypass the security challenge further cause the computer system to remove from a display a set of user interface elements associated with the security challenge.

14. The non-transitory computer-readable storage medium of claim 12, wherein the first executable instructions that cause the computer system to use the bypass token to bypass the security challenge further cause the computer system to:

transmit, to the second service, the bypass token;

obtain, from the second service, second executable instructions that, if executed by the one or more processors of the computer system, cause the computer system to remove from a display a set of user interface elements associated with the security challenge; and execute, by the one or more processors of the computer system, the second executable instructions to remove from the display the set of user interface elements associated with the security challenge.

15. The non-transitory computer-readable storage medium of claim 12, wherein the first executable instructions that cause the computer system to use the bypass token to bypass the security challenge further cause the computer system to:

obtain, from the bypass token, a response to the security challenge that indicates authorization to bypass the security challenge; and provide the response to the security challenge to bypass the security challenge.

16. The non-transitory computer-readable storage medium of claim 12, wherein the first executable instructions further cause the computer system to:

obtain an indication to communicate with the agent instead of submitting a correct response to the security challenge;

transmit a request to the second service to establish a communications session with the agent; and as a result of the communications session being established with the agent, enable communications between the user and the agent over the communications session.

17. The non-transitory computer-readable storage medium of claim 12, wherein the first executable instructions that cause the computer system to obtain the bypass token further cause the computer system to query the second service to determine whether any bypass tokens are available for use in bypassing the security challenge.

18. The non-transitory computer-readable storage medium of claim 12, wherein the bypass token becomes expired as a result of the bypass token being utilized by another computer system associated with another user.

19. The non-transitory computer-readable storage medium of claim 12, wherein the security challenge is a Completely Automated Public Turing test to tell Computers and Humans Apart.

* * * * *